INVENTORS
RICHARD L. GOWAN
HOWARD V. TYLER

INVENTORS
RICHARD L. GOWAN
HOWARD V. TYLER
BY
ATTORNEYS

United States Patent Office 3,458,660
Patented July 29, 1969

3,458,660
PULSE PARAMETER MEASURING SYSTEM
Richard L. Gowan, Coronado, and Howard V. Tyler, San Diego, Calif., assignors to the United States of America as represented by the Secretary of the Navy
Filed Jan. 11, 1966, Ser. No. 520,313
Int. Cl. H04j 1/16, 3/14; G01r 19/26
U.S. Cl. 179—15   3 Claims

ABSTRACT OF THE DISCLOSURE

Automatic test equipment for monitoring pulse parameters such as amplitude and width of discrete pulses.

---

Pulse amplitude width and wave shapes are good indicators of the operability of such complex pulse equipments as radar and computers. Unfortunately, the dimensions of a single pulse have heretofore been measured only by sophisticated and costly laboratory setups. If the signal at a selected test point in a radar or computer, for example, is to truly represent operability of the circuits at that point, the width of a pulse must be accurately measured at the same time amplitude is determined. Then, if width and amplitude stay within prescribed limits the circuit under test can be assumed to be operative. The next problem is to gather the information concerning the parameters of pulses obtained at widely scattered points, without deterioration of the information.

The object of this invention is to provide an improved automatic test equipment for measuring pulse parameters at a plurality of points throughout complex pulse-handling equipment.

The objects of this invention are attained by a pulse isolation circuit for isolating a single pulse from the series of pulses that may be found at a test point, and then measuring the width of the isolated pulse, measuring the amplitude of the isolated pulse, and finally converting these measurements to a frequency analogous to the parameter measured and multiplexing these frequencies to a central control station.

Other objects and features of this invention will occur to those skilled in the art by referring to the specific embodiment described in the following specification and shown in the accompanying drawing in which.

Any number of terminals, 1 to $n$ are to be connected to points in the equipment, the operation of which is to be monitored. It is contemplated that with the test equipment disclosed here the test points will contain pulses which must be constantly measured. All circuits connected to such test points should logically be of high impedance so as to not load the circuits being tested.

To each test point is coupled two or more voltage-to-frequency converts, such as those shown at 11 and 14. These converts comprise oscillators which are voltage sensitive. That is, the frequency of oscillation is analogous to a direct current voltage applied to the frequency determining element of the oscillator. One voltage-to-frequency converter which has been found particularly useful in the system of this invention is described in detail in the copending application Ser. No. 494,285, filed Oct. 8, 1965, now abandoned.

At 10 and 13, are shown two sensors for deriving direct current voltages proportional, respectively, to parameters of the pulse of interest. Sensor 10 is employed to measure the amplitude of the pulse derived at test point 1. The direct current output voltage of sensor 10 is proportional then, to the amplitude of the pulse under observation. One amplitude sensor found to be particularly desirable here is described in detail in the copending application Ser. No. 523,461, filed Jan. 27, 1966.

Figure 1:
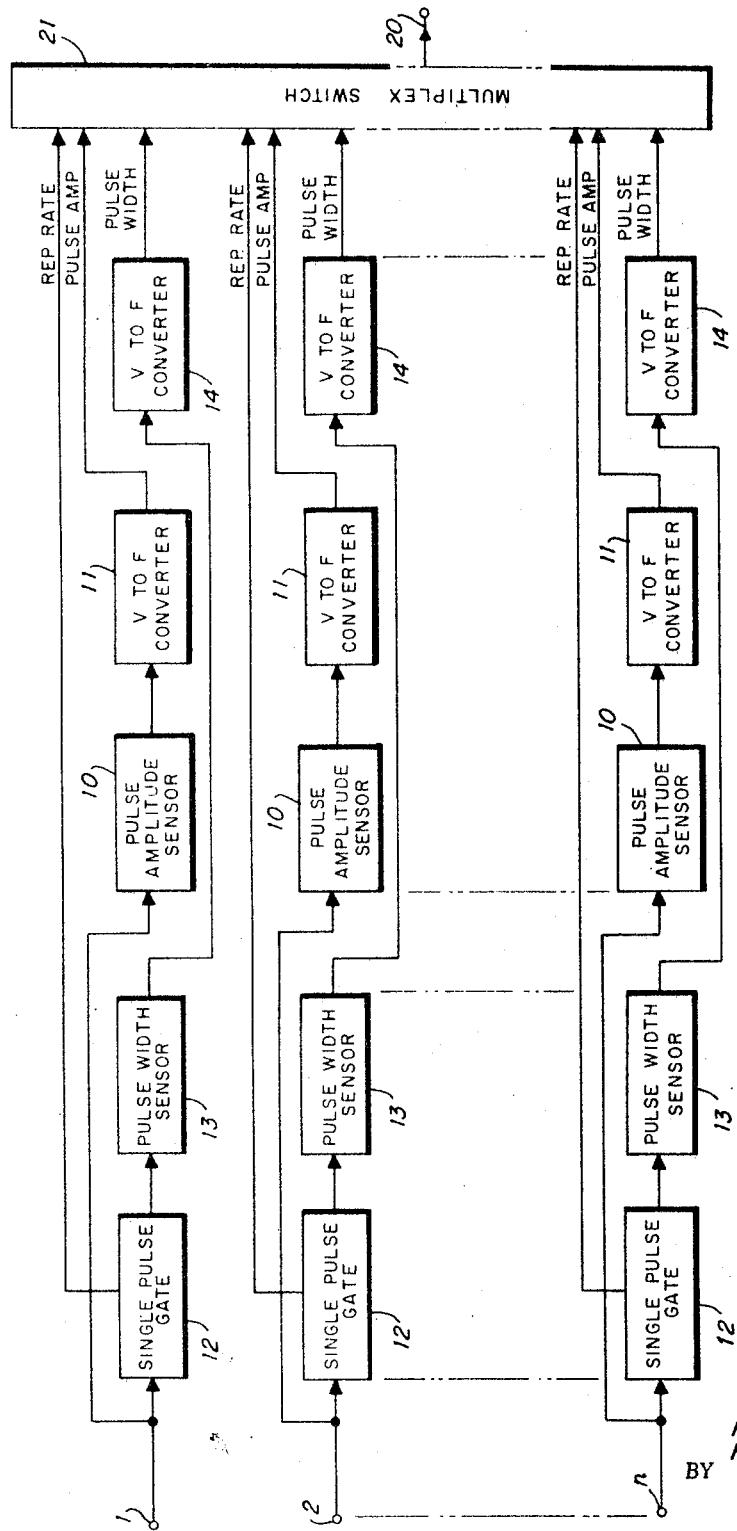
FIG. 1 shows a block diagram of the test system of this invention.
Figure 2:
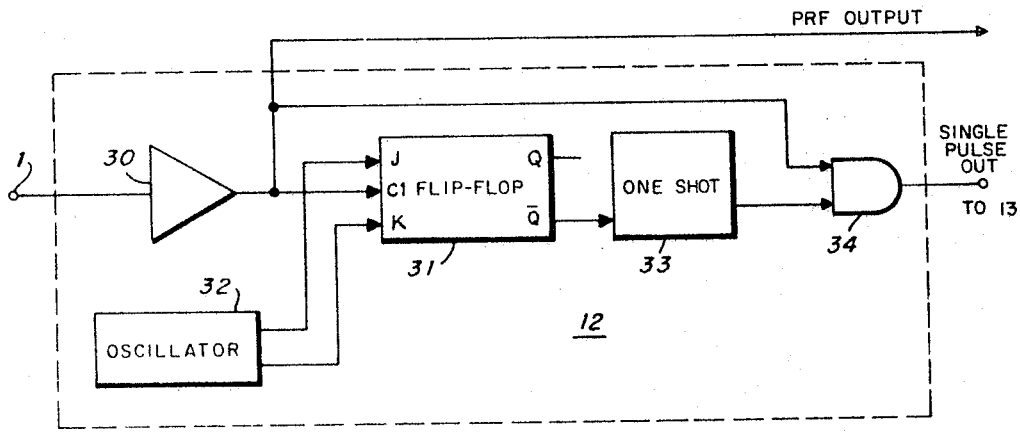
FIG. 2 shows details of the single pulse gate of FIG. 1.
Figure 3:
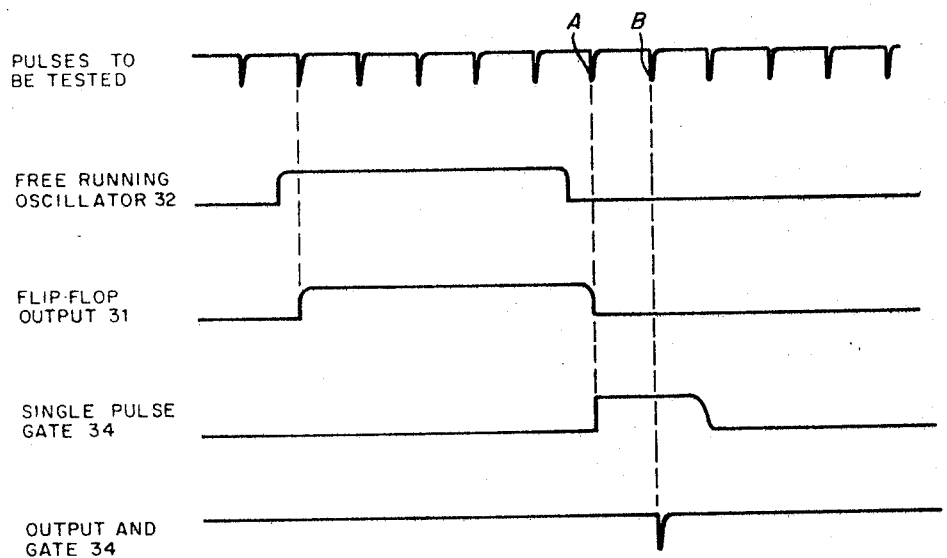
FIG. 3 is a timing diagram of the principal voltages of the circuits of FIG. 2.

Sensor 13, on the other hand, is intended to generate an output direct current voltage which is proportional to the width of a single pulse derived at test point 1. The single pulse gate 12 for isolating a single pulse from among a series of pulses is shown in general in FIG. 2 and FIG. 3 and is described in detail in copending application Ser. No. 520,315, filed Jan. 11, 1966. Briefly, as shown in FIGS. 2 and 3, the pulses to be tested at test point 1 are normalized in amplitude in level changer 30 and applied to logic circuit means for enabling the signal path of AND gate 34 for the passage of one pulse only. The logic circuitry includes means for applying the pulses to the clock control input terminal of flip-flop 31. The other two input terminals of flip-flop 31 are connected to the complementary outputs of free running oscillator 32, one output voltage of which is shown in FIG. 3. Flip-flop 31 is preferably of the commercially known "JK" flip-flop which requires like voltages on the J and K input terminals to permit the clock pulse, C1, to set or reset the flip-flop, as shown. The negative-going $\overline{Q}$ voltage of flop-flop 1, at the instant of pulse A, triggers the one-shot multivibrator which generates an enabling voltage for AND gate 34 of sufficient duration to permit the next succeeding pulse B, and only that one pulse B, to pass through gate 34.

It appears now that at the output of the converters 11 and 14 are frequencies which are proportional to the direct current voltages obtained from the sensors 10 and 13 which voltages are truly representative of the parameters of the pulses under observation. Each of these frequency-analogous signals is generated for each of the test points 1, 2, $n$ in the pulse equipment to be monitored.

It is frequently desirable to know the pulse repetition rate at the test point being monitored. For this purpose the signal of interest is passed through a level changer and is connected to a channel of the multiplex switch 21.

The single pulse gate 12, the pulse width sensor 13, the pulse amplitude sensor 10 and the voltage-to-frequency converter 11 and 14 and the repetition rate line are repeated for each of the test points, 1, 2 . . . $n$. All the frequency analog signals are applied to the sampling or multiplexing switch 21, from which the signals can be read out over line 20 in any desired sequence.

In operation, the several frequencies are successively sampled and fed to the output 20 from which the sampled multiplexed signals are transmitted to the central control station where they are stored and/or displayed, or otherwise utilized in monitoring and operating the pulse equipment under test.

The advantage of the system of the invention is that the pulse frequencies which are truly representative of the parameters to be measured may be transmitted long distances without deterioration of the signal. Absolute voltage levels are unimportant and the control station need merely have conventional registers and other digital equipment of sufficient speed to count the sampled signals.

Many modifications may be made in the details of the various sub-combinations of this system without departing from the scope of the invention as defined in the appended claims.

What is claimed is:
1. The combination, in automatic test equipment for sampling the magnitude of a plurality of pulse parameters at a plurality of test points, comprising;
   a plurality of voltage-to-frequency converters, each converter comprising an oscillator, the frequency of said oscillator being responsive to and a function of a direct current voltage, a first plurality of sensor means coupled, respectively, to said test points, each sensor means being responsive to the amplitude of the pulses of the connected test point and being adapted to generate a direct current voltage, proportional to the amplitude of the pulses appearing at said connected test point, a second plurality of sensor means coupled, respectively, to said test points, each of said second plurality of sensor means being responsive to the width of the pulses of the connected test point and adapted to generate a direct current voltage proportional to the width of the pulses appearing at said connected test point, means for applying the generated direct current voltages of said first and second sensor means, respectively, to the frequency determining elements of said converters to generate separate pulse trains analogous in frequency to pulse amplitude and width, and multiplexing means for successively sampling said analogous pulse trains for transmission to a remote utilization center.

2. The combination of elements defined in claim 1 further comprising;

a single pulse gate assembly containing an AND gate with a signal path connected between said connected test point and one of said second sensor means, and logic circuit means responsive to the pulses of said test point for enabling said AND gate to pass only one pulse only at a time to the pulse width sensor.

3. The combination of elements defined in claim 2 further comprising;

a level changing amplifier coupled between said one test point and said logic circuit means for normalizing the pulses of said test point to a single predetermined amplitude, and means for connecting the output of said amplifier to said multiplexing means.

References Cited
UNITED STATES PATENTS

| | | | |
|---|---|---|---|
| 2,984,789 | 5/1961 | O'Brien | 179—175 X |
| 3,080,526 | 3/1963 | Porter. | |
| 3,358,129 | 12/1967 | Schultz | 329—106 X |
| 3,241,074 | 3/1966 | Baude | 328—108 |
| 3,366,882 | 1/1968 | Briley. | |

RALPH D. BLAKESLEE, Primary Examiner

U.S. Cl. X.R.

324—77, 120; 325—42, 325; 328—108; 329—106